（12）United States Patent
Li et al.

(10) Patent No.: US 10,642,476 B2
(45) Date of Patent: May 5, 2020

(54) METHOD AND APPARATUS FOR SINGLE-HAND OPERATION ON FULL SCREEN

(71) Applicant: Xiaomi Inc., Beijing (CN)

(72) Inventors: Guosheng Li, Beijing (CN); Anyu Liu, Beijing (CN); Jun Tao, Beijing (CN)

(73) Assignee: XIAOMI INC., Beijing (CN)

( * ) Notice: Subject to any disclaimer, the term of this patent is extended or adjusted under 35 U.S.C. 154(b) by 310 days.

(21) Appl. No.: 15/065,271

(22) Filed: Mar. 9, 2016

(65) Prior Publication Data

US 2017/0024105 A1 Jan. 26, 2017

(30) Foreign Application Priority Data

Jul. 22, 2015 (CN) .......................... 2015 1 0434157

(51) Int. Cl.
*G06F 3/0488* (2013.01)
*G06F 3/0484* (2013.01)
*G06F 3/0481* (2013.01)

(52) U.S. Cl.
CPC ........ *G06F 3/0488* (2013.01); *G06F 3/04812* (2013.01); *G06F 3/04817* (2013.01); *G06F 3/04842* (2013.01); *G06F 2203/04803* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,643,616 B1* | 2/2014 | Zhang | ................. | G06F 3/04842 345/173 |
| 2009/0079731 A1* | 3/2009 | Fitzmaurice | ........ | G06F 3/04815 345/419 |

(Continued)

FOREIGN PATENT DOCUMENTS

| | | |
|---|---|---|
| CN | 102375580 A | 3/2012 |
| CN | 103019588 A | 4/2013 |

(Continued)

OTHER PUBLICATIONS

Examination Report dated Dec. 20, 2017 for European Application No. 16180601.3, 5 pages.

(Continued)

*Primary Examiner* — Ryan Barrett
*Assistant Examiner* — Haimei Jiang
(74) *Attorney, Agent, or Firm* — Brinks Gilson & Lione

(57) ABSTRACT

The present disclosure relates to a method and an apparatus for single-hand operation on a full screen of a smart device, which pertains to the field of computer technology. The method for single-hand operation on a full screen includes determining whether a single-hand operation mode is activated, displaying a cursor indicator on the screen of the smart device when the single-hand operation is activated, moving the cursor indicator based on a track generated by a sliding operation on the screen of the smart device, determining whether the cursor indicator is moved into a trigger region, and activating the trigger region to receive an instruction associated with a touch event on the screen when the cursor indicator is moved into the trigger region. The touch event locates outside the trigger region.

15 Claims, 7 Drawing Sheets

(56) References Cited

U.S. PATENT DOCUMENTS

| | | | | |
|---|---|---|---|---|
| 2011/0169749 | A1* | 7/2011 | Ganey | G06F 1/1626 345/173 |
| 2012/0151352 | A1 | 6/2012 | S. et al. | |
| 2013/0285956 | A1 | 10/2013 | Kamii et al. | |
| 2014/0071049 | A1* | 3/2014 | Min | G06F 3/0488 345/158 |
| 2014/0104170 | A1* | 4/2014 | Huh | G06F 3/04886 345/158 |
| 2014/0152593 | A1* | 6/2014 | Wu | G06F 3/0416 345/173 |
| 2014/0160073 | A1* | 6/2014 | Matsuki | G06F 3/0485 345/174 |
| 2015/0205522 | A1* | 7/2015 | Zeng | G06F 3/04886 715/847 |
| 2016/0313813 | A1* | 10/2016 | Neisler | G06F 3/03543 |

FOREIGN PATENT DOCUMENTS

| | | |
|---|---|---|
| CN | 103412725 A | 11/2013 |
| CN | 103763427 A | 4/2014 |
| CN | 104035716 A | 9/2014 |
| CN | 104035719 A | 9/2014 |
| CN | 104049898 A | 9/2014 |
| CN | 104380238 A | 2/2015 |
| EP | 2 799 971 A2 | 11/2014 |
| JP | 2012-203432 A | 10/2012 |
| JP | 2013-030050 A | 2/2013 |
| JP | 2013-073365 A | 4/2013 |
| JP | 2014-089522 A | 5/2014 |
| JP | 2014-219726 A | 11/2014 |
| JP | 2015-049837 A | 3/2015 |
| RU | 2 509 340 C1 | 3/2014 |
| WO | WO 2010/092993 A1 | 8/2010 |
| WO | WO 2014/208691 A1 | 12/2014 |

OTHER PUBLICATIONS

Office Action dated Dec. 12, 2017 Japanese Application No. 2017-529131, 3 pages.
International Search Report dated Apr. 20, 2016 for International Application No. PCT/CN2015/098852, 5 pages.
English Translation of International Search Report dated Apr. 20, 2016 for International Application No. PCT/CN2015/098852, 4 pages.
Extended European Search Report dated Nov. 24, 2016 for European Application No. 16180601.3, 9 pages.
Office Action dated Aug. 8, 2017 for Japanese Application No. 2017-529131, 5 pages.
Office Action dated Mar. 20, 2017 for Korean Application No. 10-2016-7004901, 6 pages.
Office Action dated Aug. 2, 2017 for Russian Application No. 2016112902/08, 12 pages.
Office Action dated Apr. 18, 2019 for Chinese Application No. 201510434157.X, 7 pages.

* cited by examiner

METHOD AND APPARATUS FOR SINGLE-HAND OPERATION ON FULL SCREEN

CROSS-REFERENCE TO RELATED APPLICATIONS

The present application is based upon and claims priority to Chinese Patent Application No. 201510434157.X filed Jul. 22, 2015, the entire contents of which are incorporated herein by reference.

TECHNICAL FIELD

The present disclosure generally relates to the field of computer technology, and more particularly, to a method and an apparatus for single-hand operation on a full screen.

BACKGROUND

With smart devices become increasingly versatile, smart devices tend to have increasingly larger screens, in order to achieve more functions and better display effects. However, for a user accustomed to single-hand operations, it is a challenge performing a single-hand operation on a full screen of a large-screen smart device.

In order to facilitate the user to perform single-hand operation on a large-screen smart device, a smart device is generally provided with a single-hand operation mode. Upon receiving an instruction for calling the single-hand operation mode, the smart device zooms out contents displayed on the full screen and displays them in a predetermined fixed region that is smaller than the full screen of the smart device, so that the user can operate with a single hand on the contents into the predetermined fixed region.

SUMMARY

According to a first aspect of embodiments of the present disclosure, there is provided a method for single-hand operation on a full screen of a smart device. The method includes determining whether a single-hand operation mode is activated, displaying a cursor indicator on the screen of the smart device when the single-hand operation mode is activated, moving the cursor indicator based on a track generated by a sliding operation on the screen of the smart device, determining whether the cursor indicator is moved into a trigger region, and activating the trigger region to receive an instruction associated with a touch event on the screen when the cursor indicator is moved into the trigger region. The touch event locates outside the trigger region.

According to a second aspect of embodiments of the present disclosure, there is provided an apparatus for single-hand operation on a full screen of a smart device. The apparatus includes a processor, and a memory for storing instructions executable by the processor. The processor is configured to perform determining whether a single-hand operation mode is activated, displaying a cursor indicator on a screen of the smart device when the single-hand operation mode is activated, moving the cursor indicator based on a track generated by a sliding operation on the screen of the smart device, determining whether the cursor indicator is moved into a trigger region, and activating the trigger region to receive an instruction associated with a touch event on the screen when the cursor indicator is moved into the trigger region. The touch event locates outside the trigger region.

According to a second aspect of embodiments of the present disclosure, a non-transitory computer-readable storage medium having stored therein instructions that, when executed by a processor of a smart device, causes the smart device to perform a single-hand operation method. The method includes displaying a plurality of icons on the screen, determining whether a single-hand operation mode is activated, displaying a cursor indicator on the screen of the smart device when the single-hand operation mode is activated, moving the cursor indicator onto a first icon of the plurality of icons based on a track generated by a sliding operation on the screen of the smart device, receiving a touch event that occurs in an area of a second icon locating outside the first icon, and activating the first icon in response to the touch event, and not activating the second icon that would otherwise respond to the touch event. The touch event locates outside the trigger region.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
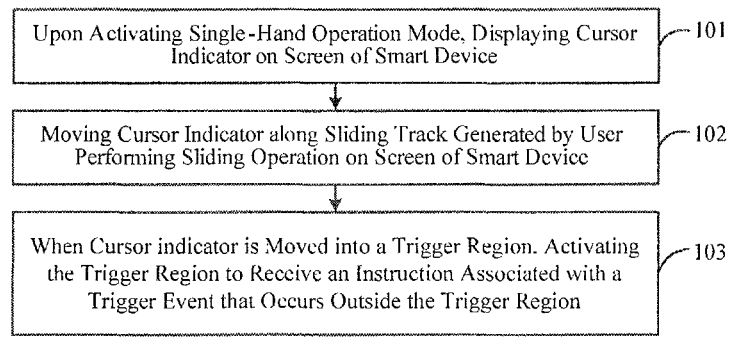
FIG. 1 is a flow chart illustrating a method for single-hand operation on a full screen according to an exemplary embodiment.

FIG. 1 is a flow chart illustrating a method for single-hand operation on a full screen according to an exemplary embodiment. As shown in FIG. 1, the method for single-hand operation on a full screen is applied in a smart device. Herein, the smart device can be a device having a touch panel, such as a smart phone, a tablet computer, a multimedia player or the like. The method for single-hand operation on a full screen specifically includes the following steps.

In step 101, upon a single-hand operation mode being activated, a cursor indicator is displayed on a screen of the smart device. An activation of the single-hand operation mode is described in detail below with reference to FIG. 2A.

In step 102, the cursor indicator is moved along a sliding track generated by a user performing sliding operation on the screen of the smart device. For example, the sliding operation may be a sliding touch by a finger of a user. Specifically, the sliding operation may be a sliding touch by a thumb of the user who is grabbing the smart device.

In step 103, when the cursor indicator is moved into a trigger region, the trigger region is activated to receive an instruction associated with a trigger event that occurs outside the trigger region. The trigger event, for example, can be a single click, or double click by a user on the screen.

Accordingly, in the method for single-hand operation on a full screen of the embodiments of the present disclosure, when the single-hand operation mode is activated, the cursor indicator is displayed on the screen of the smart device. The cursor indicator can be moved along a sliding track generated by the user performing sliding operation on the screen of the smart device. When the cursor indicator is moved into a trigger region, the trigger region is activated to receive an instruction associated with a trigger event. Since after the single-hand operation mode is activated, single-hand operation of a small range can achieve movement of the cursor indicator throughout the range of the full screen, and can trigger a trigger region where the cursor indicator is located, the contents displayed on the full screen are not required to be zoomed out. Thereby, the present disclosure can solve the problem that it is difficult for the user to perform single-hand operation on the full screen of a large-screen smart device. Also, the present disclosure allows the single-hand operation on the full screen without zooming out the contents displayed on the full screen.

Figure 2A:
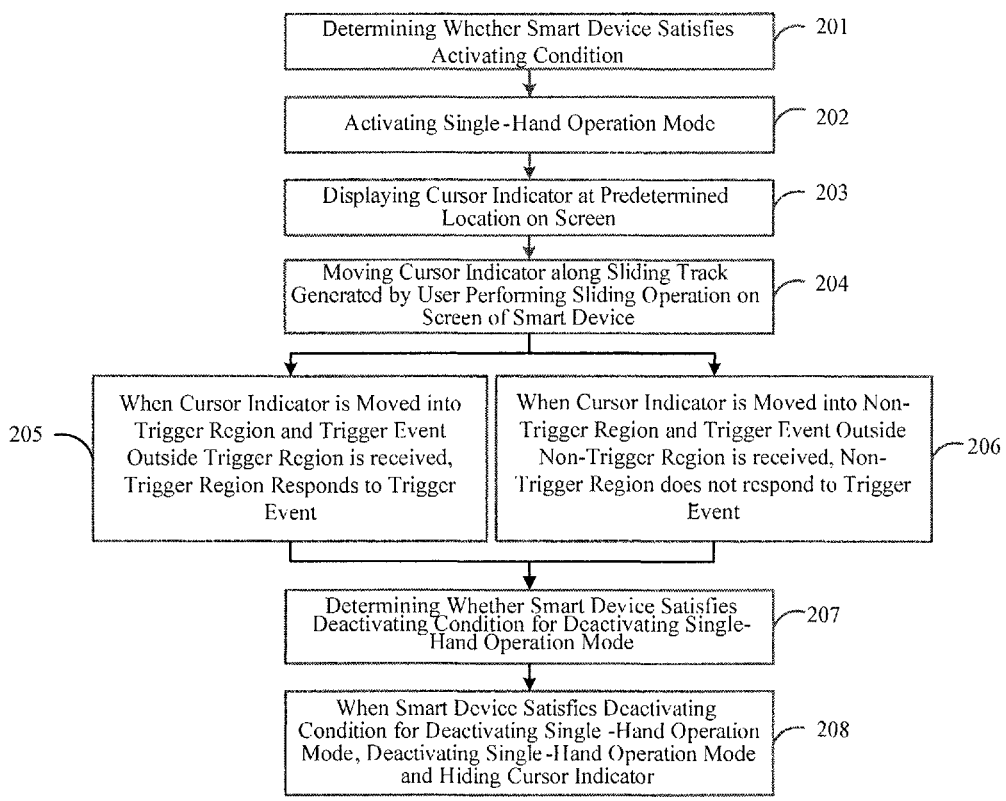
FIG. 2A is a flow chart illustrating a method for single-hand operation on a full screen according to another exemplary embodiment.

FIG. 2A is a flow chart illustrating a method for single-hand operation on a full screen according to another exemplary embodiment. As shown in FIG. 2A, the method for single-hand operation on a full screen is applied in a smart device. Herein, the smart device can be a device having a touch panel, such as a smart phone, a tablet computer, a multimedia player or the like. The method for single-hand operation on a full screen specifically includes the following steps.

In step 201, it is determined whether the smart device satisfies an activating condition. The activating condition refers to a condition required for activating the single-hand operation mode. In practical application, the activating condition can be various forms, such as shaking up and down the smart device, shaking left and right the smart device, shaking the smart device in a circle, double clicks on the screen of the smart device, long press on a button of the smart device, press combination of buttons, a voice instruction, and the like. The activating condition can be preset by the user through a system setup interface.

For example, the activating condition can be the smart device being moved according to a predetermined first gesture. Herein, the predetermined first gesture refers to a way how the smart device is moved according to a predetermined track, which can be shaking up and down, shaking left and right, shaking in a circle, or the like. For example, the smart device is generally equipped with a sensor such as a gyroscope or the like. When the smart device is moved, the sensor in the smart device can determine the state of the smart device based on a direction and displacement of the rotary shaft and generate movement information.

The activating condition can also be the smart device being moved with an acceleration exceeding a predetermined first acceleration threshold. Generally, the sensor equipped in the smart device can acquire information about the movement state of the smart device, including an acceleration or the like. For example, the first acceleration threshold is a $m/s^2$, and when the smart device is shook fast with an acceleration of b $m/s^2$, if it is determined that b>a, the fast shaking satisfies the activating condition.

The activating condition can also be the smart device being touched on a predetermined first physical button. For example, the first physical button may refer to a solid button, such as a Home button, a volume button, or the like. The user can preset a physical button and a touch operation corresponding to the button in the system setup interface, such as long press on the button or press combination of buttons. For example, if the activating condition is preset as a long press on the Home button, when the user performs a long press on the Home button, the activating condition is satisfied.

The activating condition can also be the smart device being touched on the screen according to a predetermined first operation. For example, the predetermined first operation can be sliding along a particular sliding track, double clicks at a particular location or the like. For example, the predetermined first operation can be double clicks on a central region of the screen, and when the user performs double clicks on the central region of the screen, the activating condition is satisfied.

In the present embodiment, the activating condition is not specifically limited. In principle, it is into the protective scope of the present disclosure as long as it can activate the single-hand operation mode.

In step 202, the single-hand operation mode is activated. Herein, the single-hand operation mode refers to a mode in which operation on a full screen can be realized by operation within a reachable region by a single hand grabbing the smart device. In the single-hand operation mode, the user can achieve operation on the full screen by operating on an area suitable for his single hand operation.

It can be understood that, in the single-hand operation mode described herein, none of the applications in the smart device respond to a touch operation of the user, but each of them only responds to a cursor indicator displayed in step 203.

In step 203, a cursor indicator is displayed at a predetermined location on the screen. Herein, the cursor indicator is configured to indicate a current location of the cursor on the screen. Or it can be understood that, the cursor indicator is configured to indicate a location on the screen of the smart device the user currently intends to designate. The cursor indicator can be a translucent pointer, a flashing cursor, a blinking ring or an indicator of any shape, which can indicate the current location of the cursor. The shape of the cursor indicator is not limited herein.

The predetermined location herein is where the cursor indicator is displayed upon the single-hand operation mode being activated. Depending on practical application, the user can preset the predetermined location of the cursor indicator displayed upon the single-hand operation mode being activated, which can be the central location of the screen, or a location where the cursor indicator was displayed last time, and so on.

It should be noted that the cursor indicator is allowed to be moved to any location on the screen of the smart device. That is, in displaying the cursor indicator, the attribute of the cursor indicator can be set as being allowed to be moved on the full screen.

In step 204, the cursor indicator is moved along a sliding track generated by a user performing sliding operation on the screen of the smart device. Herein, the sliding operation may refer to continuous touch operation which forms the sliding track on the screen. The sliding track has a starting point and a finishing point.

Figure 2B:
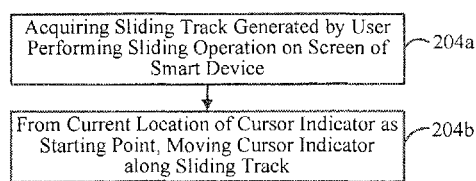
FIG. 2B is a flow chart illustrating a process of moving a cursor indicator along a sliding track generated by a user performing sliding operation on a screen of a smart device, according to an exemplary embodiment.

Generally, the sliding track generated by the user on the screen may be a touching track by the user physically touching the screen. The user can operate on the region where he touches. When operating on a large screen, it is difficult for the user to touch every location on the full screen with a single hand. After the single-hand operation mode is activated, the user can move the cursor indicator on the full-screen range by sliding operations. Specifically, referring to FIG. 2B, which is a flowchart illustrating a process of moving the cursor indicator along the sliding track generated by the user performing sliding operation on the screen of the smart device according to an exemplary embodiment, including the following steps.

In step 204a, the sliding track generated by the user performing sliding operation on the screen of the smart device is acquired. Generally, when the user performs sliding operation on the screen of the smart device, the touch panel can report locations of the touch points, to acquire the touching track.

In step 204b, from a current location of the cursor indicator as a starting point, the cursor indicator is moved along the sliding track. Herein, the current location of the cursor indicator refers to the location where the cursor indicator is currently displayed on the screen. From the current location of the cursor indicator as the starting point, the cursor indicator is moved along the sliding track. For example, the cursor indicator moves in parallel with the sliding track.

Figure 2C:
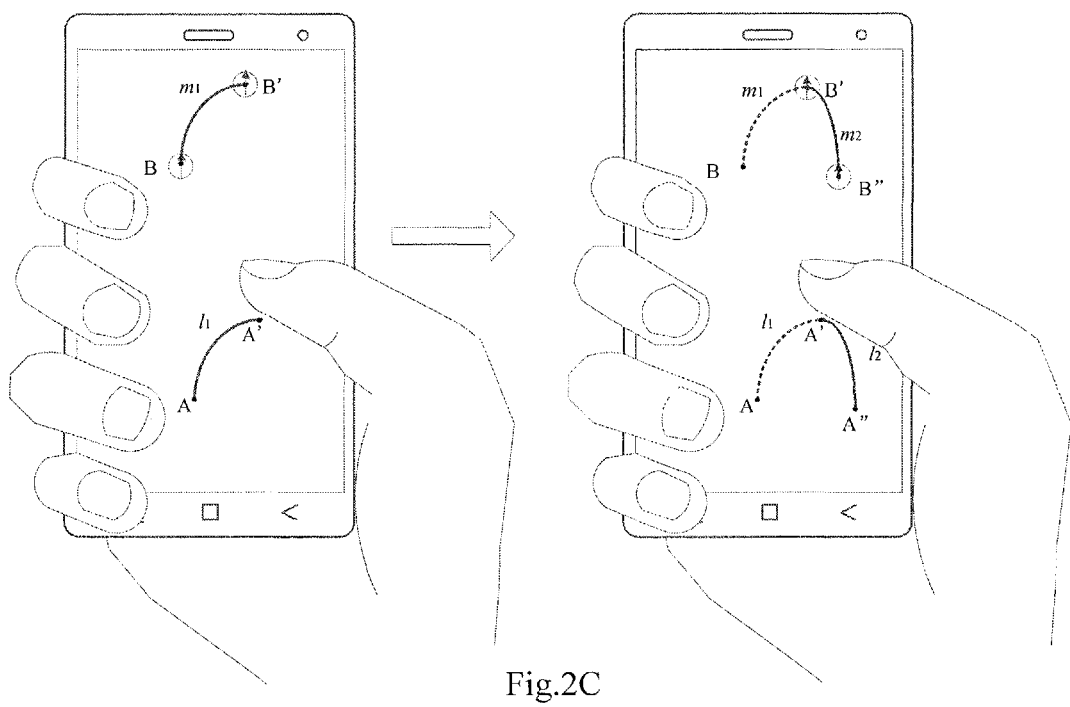
FIG. 2C is a schematic diagram illustrating a process of moving a cursor indicator along a sliding track from a current location of a cursor indicator as a starting point, according to an exemplary embodiment.

Specifically, referring to FIG. 2C, which is a schematic diagram illustrating a process of moving the cursor indicator along the sliding track from the current location of the cursor indicator as the starting point, according to an exemplary embodiment. When the user performs sliding operation with his finger on the screen along a sliding track $l_1$ from Point A to Point A', the cursor indicator at Location B is moved along a track $m_1$ from Location B as the starting point to Location B', the track $m_1$ is the same with the track $l_1$. Subsequently, when the user performs another sliding operation with his finger on the screen along a sliding track $l_2$ from Point A' to Point A", the cursor indicator is moved along a track $m_2$ from Location B' as the starting point to Location B", the track $m_2$ is the same with the track $l_2$.

Figure 2D:
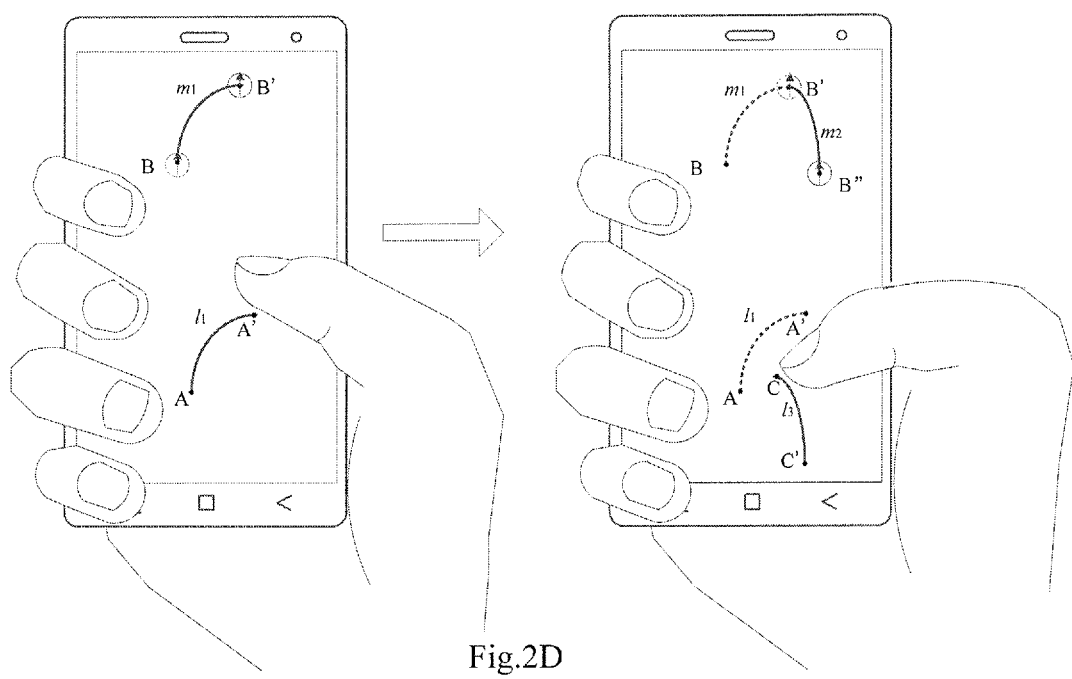
FIG. 2D is a schematic diagram illustrating a process of moving the cursor indicator along the sliding track from the current location of the cursor indicator as the starting point, according to another exemplary embodiment.

In practical application, the user may perform two discontinuous sliding operations, that is, the finishing point of the first sliding operation does not overlap with the starting point of the second sliding operation. In this case, the cursor indicator can still be moved along a sliding track from the current location as the starting point. For example, as shown in FIG. 2D, which is a schematic diagram illustrating a process of moving the cursor indicator along the sliding track from the current location of the cursor indicator as the starting point, according to another exemplary embodiment. When the user performs sliding operation with his finger on the screen along a sliding track $l_1$ from Point A to Point A', the cursor indicator at Location B is moved along a track $m_1$ from Location B as the starting point to Location B', the track $m_1$ is the same with the track $l_1$. Subsequently, when the user performs another sliding operation with his finger on the screen along a sliding track $l_3$ from Point C to Point C', the cursor indicator is moved along a track $m_2$ from Location B' as the starting point to Location B". In this case, the Point C is a different point from the point that is, the two sliding tracks previous and immediately next which are generated by the user are not connected to each other.

Generally, the user activates the single-hand mode to facilitate relevant operation with his single hand on the current interface. The relevant operation may include a single click or double clicks on an icon of an application, a single click or double clicks on an operation guide of a browsing page, or other operation with respect to the trigger region.

In step 205, when the cursor indicator is moved into a trigger region and a trigger event triggered by the user outside of the trigger region is received, the trigger region responds to the trigger event.

The trigger region refers to a region for receiving and responding to a trigger instruction, such as an icon region of an application in the smart device. When the location of the cursor indicator moves into the trigger region, the trigger region can be brightened, highlighted or zoomed in to show its difference from other non-selected regions.

The trigger operation herein includes operation that can generate a trigger event. For example, the trigger operation can be a single click, double clicks or the like. In practical application, when the user performs trigger operation on the smart device in the single-hand operation mode, the trigger operation is directed to the location of the cursor indicator while the physical user operation is actually outside the trigger region. Then, the trigger region responds to the trigger operation.

Figure 2E:
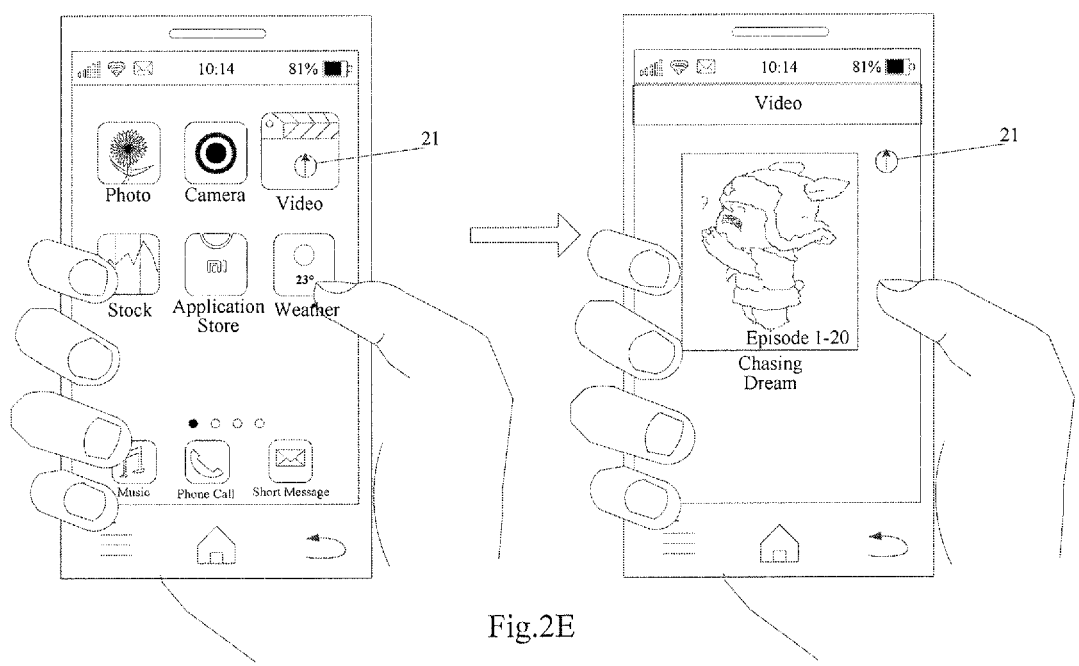
FIG. 2E is a schematic diagram illustrating a process of responding to a trigger operation performed in a trigger region when the cursor indicator is moved into the trigger region allowing response to trigger operation, according to an exemplary embodiment.

For example, FIG. 2E is a schematic diagram illustrating a process of responding to a trigger operation performed in a trigger region when the cursor indicator is moved into the trigger region allowing response to trigger operation, according to an exemplary embodiment. When the cursor indicator 21 moves to the icon of Application Video, the icon region of the Video is zoomed in, to prompt the user that the icon can be triggered. At this time, the user's finger is on the icon of Application Weather, but the icon region of the Weather is not zoomed out. Then, the user clicks the screen, the Application Video is started, but not the Application Weather where the user's finger is located.

In practical application, the cursor indicator can be moved to any position of the screen. When the cursor indicator moves to a trigger region, other regions become non-trigger regions which do not respond to trigger operation. When the user is actually be into a region for responding to a trigger event, optionally, responses to both of the trigger event from the user and trigger operation performed in the non-trigger region will be disallowed.

In step 206, when the cursor indicator is moved into a non-trigger region and a trigger event outside the non-trigger region with respect to the screen is received, response to the trigger event is disallowed and response to trigger operation performed in the non-trigger region is disallowed.

Figure 2F:
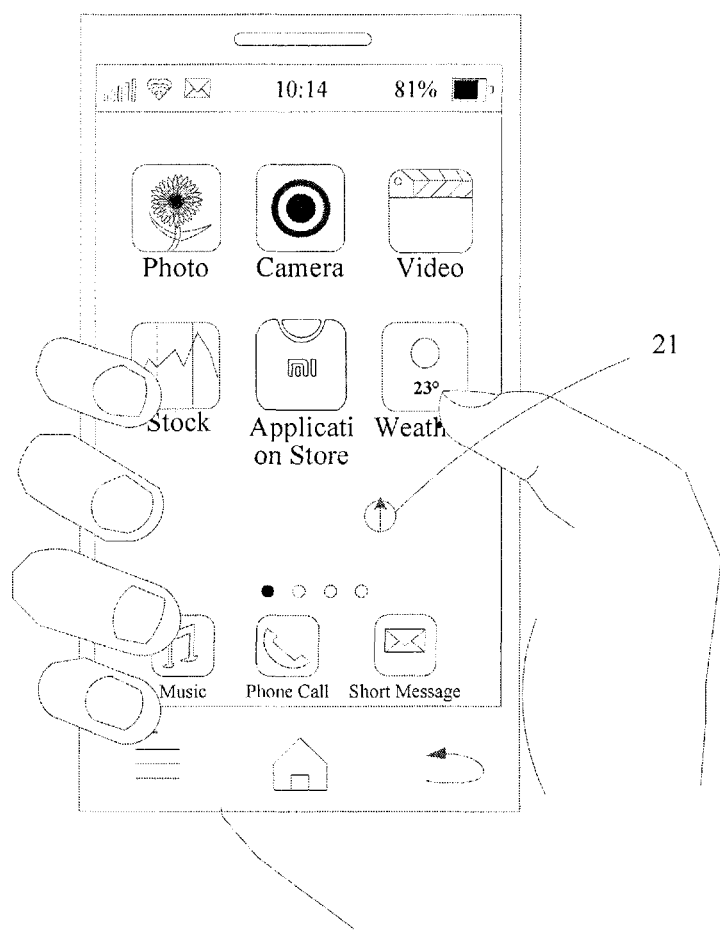
FIG. 2F is a schematic diagram illustrating a situation when the cursor indicator is moved into a non-trigger region disallowing response to trigger operation and a trigger event generated by the user with respect the screen is received, according to an exemplary embodiment.

For example, as shown in FIG. 2F, which is a schematic diagram illustrating a situation when the cursor indicator is moved into a non-trigger region disallowing response to trigger operation and a trigger event generated by the user with respect the screen is received, according to an exemplary embodiment. In this example, the cursor indicator 21 moves into the non-trigger region and the user's finger is actually at the Application Weather. When the user performs a single click on the screen, the cursor indicator 21 does not respond to the single-click operation, and the Application Weather is not started.

In practical application, the user may not always operate the smart device in the single-hand operation mode, and may need to return to a normal operation mode.

In step 207, it is determined whether the smart device satisfies a deactivating condition for deactivating the single-hand operation mode. Herein, the deactivating condition is for quitting the single-hand operation mode on the full screen. Similar to the activating condition, the deactivating condition can be the same with the activating condition, or different from it.

In practical application, the deactivating condition can be various forms. For example, the deactivating condition can be the smart device being moved according to a predetermined second gesture. Herein, the predetermined second gesture refers to a way how the smart device is moved according to a predetermined track, which can be shaking up and down, shaking left and right, shaking in a circle, or the like. For example, the smart device is generally equipped with a sensor such as a gyroscope or the like. When the smart device is moved, the sensor in the smart device can detect the state of the smart device based on a direction and displacement of the rotary shaft and generate movement information.

The deactivating condition can be also be the smart device being moved with an acceleration exceeding a predetermined second acceleration threshold. Generally, the sensor equipped in the smart device can acquire information about the movement state of the smart device, including an acceleration or the like. For example, the first acceleration threshold is c $m/s^2$, and when the smart device is shook fast with an acceleration of d $m/s^2$, if it is determined that d>c, the fast shaking satisfies the deactivating condition.

The deactivating condition can also be the smart device being touched on a predetermined second physical button. Herein, the second physical button refers to a solid button, such as a Home button, a volume button, or the like, The user can preset a physical button and a touch operation corresponding to the button in the system setup interface, such as long press on the button or press combination of buttons. For example, if the deactivating condition is set as a long press on the Home button, when the user performs a long press on the Home button, the deactivating condition is satisfied.

The deactivating condition can also be the smart device being touched on the screen according to a predetermined second operation. Herein, the predetermined second operation can be sliding along a particular sliding track, double clicks at a particular location or the like. For example, the predetermined second operation can be double clicks on a central region of the screen, and when the user performs double clicks on the central region of the screen, the deactivating condition is satisfied.

In the present embodiment, the deactivating condition is not specifically limited. In principle, it is into the protective scope of the present disclosure as long as it can deactivate the single-hand operation mode.

In step 208, when the smart device satisfies the deactivating condition for deactivating the single-hand operation mode, the single-hand operation mode is deactivated and the cursor indicator is hidden. Herein, hiding the cursor indicator means that the cursor indicator is not displayed on the screen.

Accordingly, in the method for single-hand operation on a full screen of the embodiments of the present disclosure, when the single-hand operation mode is activated, the cursor indicator is displayed on the screen of the smart device. The cursor indicator can be moved along a sliding track generated by the user performing sliding operation on the screen of the smart device. When the cursor indicator is moved into a trigger region, the trigger region is activated to receive an instruction associated with a trigger event. Since after the single-hand operation mode is activated, single-hand operation of a small range can achieve movement of the cursor indicator throughout the range of the full screen, and can trigger a trigger region where the cursor indicator is located, the contents displayed on the full screen are not required to be zoomed out. Thereby, the present disclosure can solve the problem that it is difficult for the user to perform single-hand operation on the full screen of a large-screen smart device. Also, the present disclosure achieves the single-hand operation on the full screen without zooming out the contents displayed on the full screen. In addition, the single-hand operation mode can be activated and deactivated in many manners, thereby, it can solve the problem that it is difficult to activate and deactivate the single-hand operation mode, and can achieve an effect of fast switching to and from the single-hand operation mode.

The following are device embodiments of the present disclosure, which can be configured to perform the method embodiments of the present disclosure. For details that are not disclosed in the apparatus embodiments of the present disclosure, reference can be made to the method embodiments of the present disclosure.

Figure 3:
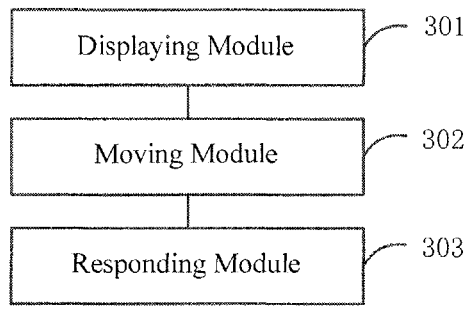
FIG. 3 is a block diagram of an apparatus for single-hand operation on a full screen according to an exemplary embodiment.

FIG. 3 is a block diagram of an apparatus for single-hand operation on a full screen according to an exemplary embodiment. As shown in FIG. 3, the apparatus for single-hand operation on a full screen is applied in a smart device. Herein, the smart device can include a device having a touch panel, such as a smart phone, a tablet computer, a multimedia player or the like. The apparatus for single-hand operation on a full screen includes but not limited to: a displaying module 301, a displaying module 302 and a responding module 303.

The displaying module 301 is configured to, upon a single-hand operation mode being activated, display a cursor indicator on a screen of the smart device. The moving module 302 is configured to move the cursor indicator displayed by the displaying module 301 along a sliding track generated by a user performing sliding operation on the screen of the smart device. The responding module 303 is configured to, when the cursor indicator displayed by the displaying module 301 is moved into a trigger region allowing response to trigger operation and a trigger event triggered by the user with respect to the screen is received, disallow response to the trigger event and respond to trigger operation performed in the trigger region.

Figure 4:
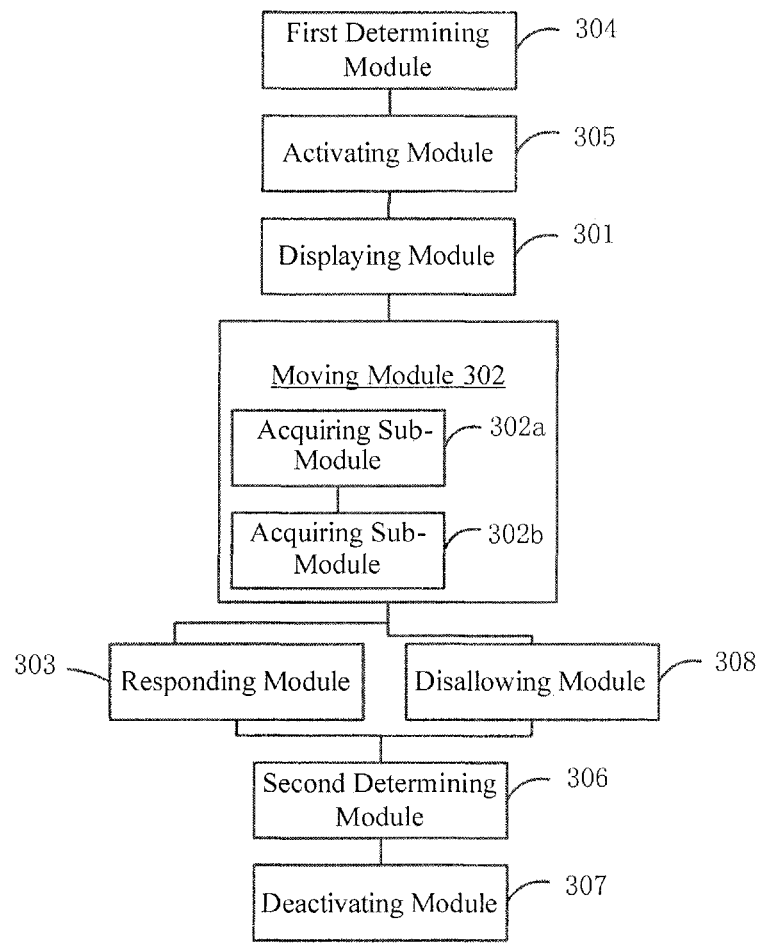
FIG. 4 is a block diagram of an apparatus for single-hand operation on a full screen according to another exemplary embodiment.

In a possible implementation, as shown in FIG. 4, which is a block diagram of an apparatus for single-hand operation on a full screen according to another exemplary embodiment, the apparatus for single-hand operation on a full screen also includes: a first determining module 304 and an activating module 305.

The first determining module 304 is configured to determine whether the smart device satisfies an activating condition. The activating condition may include the smart device being moved according to a predetermined first gesture, the smart device being moved with an acceleration exceeding a predetermined first acceleration threshold, the smart device being touched on a predetermined first physical button, or the smart device being touched on the screen according to a predetermined first operation.

The activating module 305 is configured to, when the first detecting module 304 determines that the smart device satisfies the activating condition, activate the single-hand operation mode.

In a possible implementation, as shown in FIG. 4, the displaying module 301 is further configured to display the cursor indicator at a predetermined location on the screen. The predetermined location may be a central location of the screen or a location where the cursor indicator was displayed last time, and the cursor indicator is allowed to be moved to any location on the screen of the smart device.

In a possible implementation, as shown in FIG. 4, the moving module 302 can include: an acquiring sub-module 302a and a moving sub-module 302b.

The acquiring sub-module 302a is configured to acquire the sliding track generated by the user performing sliding operation on the screen of the smart device. The moving sub-module 302b is configured to, from a current location of the cursor indicator as a starting point, move the cursor indicator along the sliding track.

In a possible implementation, as shown in FIG. 4, the apparatus for single-hand operation on a full screen also includes: a second determining module 306 and a deactivating module 307.

The second determining module 306 is configured to determine whether the smart device satisfies a deactivating condition for deactivating the single-hand operation mode. The deactivating condition may include the smart device being moved according to a predetermined second gesture, the smart device being moved with an acceleration exceeding a predetermined second acceleration threshold, the smart device being touched on a predetermined second physical button, or the smart device being touched on the screen according to a predetermined second operation.

The deactivating module 307 is configured to, when the second determining module 306 determines that the smart device satisfies the deactivating condition for deactivating the single-hand operation mode, deactivate the single-hand operation mode and hide the cursor indicator.

In a possible implementation, as shown in FIG. 4, the apparatus for single-hand operation on a full screen also includes: a disallowing module 308.

The disallowing module 308 is configured to, when the cursor indicator is moved into a non-trigger region, disallow response to trigger event triggered by the user's hand and disallow response to trigger operation performed in the non-trigger region.

Accordingly, in the apparatus for single-hand operation on a full screen of the embodiments of the present disclosure, after the single-hand operation mode is activated, the cursor indicator is displayed on the screen of the smart device. The cursor indicator can be moved along a sliding track generated by the user performing sliding operation on the screen of the smart device. When the cursor indicator is moved into a trigger region and a trigger event generated by the user with respect to the screen is received, the trigger region responses to the trigger operation and a region where the user's hand locates does not respond. Since after the single-hand operation mode is activated, single-hand operation of a small range can achieve movement of the cursor indicator throughout the range of the full screen, and can trigger a trigger region where the cursor indicator is located, the contents displayed on the full screen are not required to be zoomed out. Thereby, the present disclosure can solve the problem that it is difficult for the user to perform single-hand operation on the full screen of a large-screen smart device. Also, the present disclosure can achieve the single-hand operation on the full screen without zooming out the contents displayed on the full screen. In addition, the single-hand operation mode can be activated and deactivated in various manners. Thereby, it can solve the problem that it is difficult to activate and deactivate the single-hand operation mode, and can achieve an effect of fast switching from and to the single-hand operation mode.

With respect to the apparatus in the above embodiments, the specific manners for performing operations for individual modules therein have been described in detail in the embodiments regarding the relevant methods, which will not be elaborated herein.

An exemplary embodiment of the present disclosure, there is provided an apparatus for single-hand operation on a full screen, which can perform the method for single-hand operation on a full screen provided by the present disclosure. The apparatus for single-hand operation on a full screen includes a processor, and a memory for storing instructions executable by the processor. The processor is configured to perform determining whether a single-hand operation mode is activated, displaying a cursor indicator on the screen of the smart device, moving the cursor indicator along a sliding track generated by a user performing sliding operation on the screen of the smart device, and activating the trigger region to receive an instruction associated with a trigger event by the user when the cursor indicator is moved into the trigger region.

Figure 5:
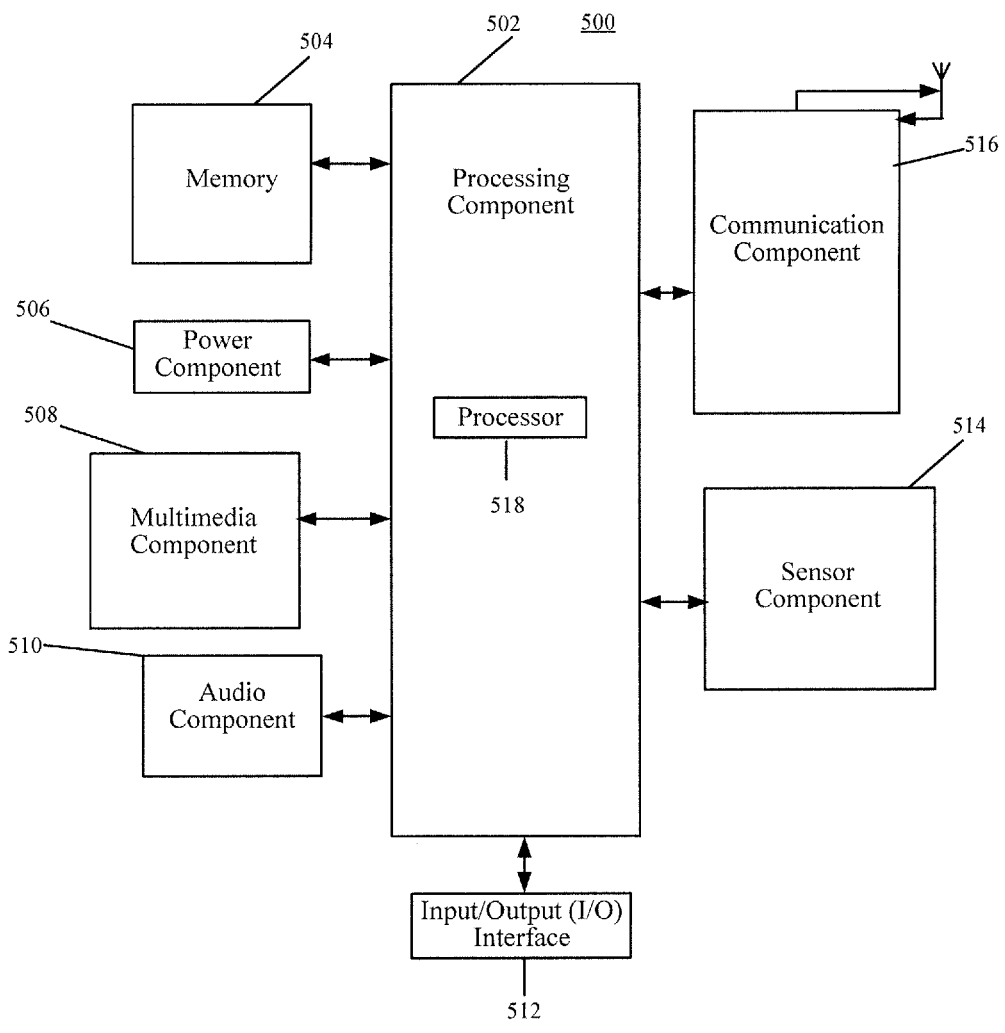
FIG. 5 is a block diagram of an apparatus for single-hand operation on a full screen according to still another exemplary embodiment.

FIG. 5 is a block diagram of an apparatus 500 for single-hand operation on a full screen according to still another exemplary embodiment. For example, the apparatus 500 can be device having a touch panel, such as a smart phone, a tablet computer, a multimedia player, or the like.

Referring to FIG. 5, the apparatus 500 can include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 can include one or more processors 518 to execute instructions to perform all or part of the steps in the above described methods. Moreover, the processing component 502 can include one or more modules which facilitate the interaction between the processing component 502 and other components. For instance, the processing component 502 can include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, contact data, phonebook data, messages, pictures, video, etc. The memory 504 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 can include a power management system, one or more power sources, and any other components associated with the generation, management, and distribution of power in the apparatus 500.

The multimedia component 508 includes a screen providing an output interface between the apparatus 500 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 508 includes a front camera and/or a rear camera. The front camera and the rear camera can receive an external multimedia datum while the apparatus 500 is in an operation mode, such as a photographing mode or a video mode. Each of the front camera and the rear camera can be a fixed optical lens system or have focus and optical zoom capability.

The audio component 510 is configured to output and/or input audio signals. For example, the audio component 510 includes a microphone ("MIC") configured to receive an external audio signal when the apparatus 500 is in an operation mode, such as a call mode, a recording mode, and a voice recognition mode. The received audio signal can be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons can include, but are not limited to, a home button, a volume button, a starting button, and a locking button.

The sensor component 514 includes one or more sensors to provide status assessments of various aspects of the apparatus 500. For instance, the sensor component 514 can detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 can include a proximity sensor configured to detect the presence of nearby objects without any physical contact. The sensor component 514 can also include a light sensor, such as a CMOS or CCD image sensor, for use in imaging applications. In some embodiments, the sensor component 514 can also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods for single-hand operation on a full screen.

In exemplary embodiments, there is also provided a non-transitory computer-readable storage medium including instructions, such as included in the memory 504, executable by the processor 518 in the apparatus 500, for performing the above-described methods. For example, the non-transitory computer-readable storage medium can be a ROM, a RAM, a CD-ROM, a magnetic tape, a floppy disc, an optical data storage device, and the like.

Each module discussed above, such as the displaying module 301, the moving module 302, and the responding module 303, may take the form of a packaged functional hardware unit designed for use with other components, a portion of a program code (e.g., software or firmware) executable by the processor or the processing circuitry that usually performs a particular function of related functions, or a self-contained hardware or software component that interfaces with a larger system, for example.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come into known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for single-hand operation of a screen of a smart device, comprising:
   determining whether a single-hand operation mode is activated;

displaying a cursor indicator on the screen of the smart device when the single-hand operation mode is activated;

moving the cursor indicator along a first sliding track from a first starting point to a first finishing point based on a second sliding track generated by a sliding operation on the screen of the smart device from a second starting point to a second finishing point, wherein the first sliding track has the same length and same shape as the second sliding track, wherein the first sliding track extends apart from and parallel to the second sliding track, and wherein the cursor indicator is movable in response to the sliding operation regardless of where on the screen of the smart device the sliding operation is performed relative to the cursor indicator;

determining whether the cursor indicator is moved into a trigger region or a non-trigger region;

activating the trigger region to receive an instruction associated with a first touch event on the screen when the cursor indicator is moved into the trigger region, wherein the first touch event can be performed anywhere on the entire screen; and setting the screen not to respond to a second touch event on the screen when the cursor indicator is moved into the non-trigger region, wherein the second touch event can be performed anywhere on the entire screen, wherein when the second touch event is performed in the trigger region, the screen does not respond and the trigger region is not activated.

2. The method of claim 1, wherein determining whether the single-hand operation mode is activated comprises:

determining whether the smart device satisfies an activating condition; and activating the single-hand operation mode when the smart device satisfies the activating condition, wherein the activating condition includes the smart device being moved according to a predetermined first gesture, the smart device being moved with an acceleration exceeding a predetermined first acceleration threshold, the smart device being touched on a predetermined first physical button, or the smart device being touched on the screen according to a predetermined first operation.

3. The method of claim 1, wherein displaying the cursor indicator on the screen of the smart device comprises:

displaying the cursor indicator at a predetermined location on the screen.

4. The method of claim 1, wherein the method further comprises:

determining whether the smart device satisfies a deactivating condition for deactivating the single-hand operation mode, the deactivating condition comprising the smart device being moved according to a predetermined second gesture, the smart device being moved with an acceleration exceeding a predetermined second acceleration threshold, the smart device being touched on a predetermined second physical button, or the smart device being touched on the screen according to a predetermined second operation; and deactivating the single-hand operation mode and hiding the cursor indicator when the smart device satisfies the deactivating condition for deactivating the single-hand operation mode.

5. The method of claim 1, wherein the method further comprises:

in response to the cursor indicator being moved into the trigger region, setting a region outside the trigger region on the screen as not being responsive to a touch event occurring inside the region outside the trigger region.

6. The method of claim 3, wherein the predetermined location is a central location of the screen or a location where the cursor indicator was displayed last time.

7. The method of claim 1, wherein activating the trigger region to receive the instruction associated with the first touch event when the cursor indicator is moved into the trigger region comprises:

zooming in the trigger region.

8. An apparatus for single-hand operation on a screen of a smart device, the apparatus comprising:

a processor; and a memory for storing instructions executable by the processor, wherein the processor is configured to perform:

displaying a plurality of icons on the screen;

determining whether a single-hand operation mode is activated;

displaying a cursor indicator on the screen of the smart device when the single-hand operation mode is activated;

determining whether the cursor indicator is moved into a non-trigger region or is moved onto a first icon of the plurality of icons when the cursor indicator is moved along a first sliding track from a first starting point to a first finishing point based on a second sliding track generated by a sliding operation on the screen of the smart device from a second starting point to a second finishing point, wherein the first sliding track has the same length and same shape as the second sliding track, wherein the first sliding track extends apart from and parallel to the second sliding track, and wherein the cursor indicator is movable in response to the sliding operation regardless of where on the screen of the smart device the sliding operation is performed relative to the cursor indicator;

when the cursor indicator is moved onto the first icon, activating the first icon to receive an instruction associated with a first touch event on the screen, wherein the first touch event can be performed anywhere on the entire screen; and when the cursor indicator is moved into the non-trigger region, setting the screen not to respond to a second touch event on the screen, wherein the second touch event can be performed anywhere on the entire screen, wherein when the second touch event is performed on the first icon, the screen does not respond and the first icon is not activated.

9. The apparatus of claim 8, wherein determining whether the single-hand operation mode is activated comprises:

determining whether the smart device satisfies an activating condition; and activating the single-hand operation mode when the smart device satisfies the activating condition, wherein the activating condition includes the smart device being moved according to a predetermined first gesture, the smart device being moved with an acceleration exceeding a predetermined first acceleration threshold, the smart device being touched on a predetermined first physical button, or the smart device being touched on the screen according to a predetermined first operation.

10. The apparatus of claim 8, wherein displaying the cursor indicator on the screen of the smart device comprises:

displaying the cursor indicator at a predetermined location on the screen.

11. The apparatus of claim 8, wherein the processor is configured to perform:

determining whether the smart device satisfies a deactivating condition for deactivating the single-hand operation mode, the deactivating condition comprising the smart device being moved according to a predetermined second gesture, the smart device being moved with an acceleration exceeding a predetermined second acceleration threshold, the smart device being touched on a predetermined second physical button, or the smart device being touched on the screen according to a predetermined second operation; and deactivating the single-hand operation mode and hiding the cursor indicator when the smart device satisfies the deactivating condition for deactivating the single-hand operation mode.

12. The apparatus of claim 8, wherein the processor is configured to perform:

in response to the cursor indicator being moved onto the first icon of the plurality of icons, setting a region outside the first icon as not being responsive to a touch event occurring inside the region outside the first icon.

13. The apparatus of claim 10, wherein the predetermined location is a central location of the screen or a location where the cursor indicator was displayed last time.

14. The apparatus of claim 8, wherein activating the first icon comprises:

zooming in the first icon.

15. A non-transitory computer-readable storage medium having stored therein instructions that, when executed by a processor of a smart device, causes the smart device to perform a single-hand operation method, the method comprising:

determining whether a single-hand operation mode is activated;

displaying a cursor indicator on a screen of the smart device when the single-hand operation mode is activated;

moving the cursor indicator along a first sliding track from a first starting point to a first finishing point based on a second sliding track generated by a sliding operation on the screen of the smart device from a second starting point to a second finishing point, wherein the first sliding track has the same length and same shape as the second sliding track, wherein the first sliding track extends apart from and parallel to the second sliding track, and wherein the cursor indicator is movable in response to the sliding operation regardless of where on the screen of the smart device the sliding operation is performed relative to the cursor indicator;

determining whether the cursor indicator is moved into a trigger region or a non-trigger region;

activating the trigger region to receive an instruction associated with a first touch event on the screen when the cursor indicator is moved into the trigger region, wherein the first touch event can be performed anywhere on the entire screen; and setting the screen not to respond to a second touch event on the screen when the cursor indicator is moved into the non-trigger region, wherein the second touch event can be performed anywhere on the entire screen, wherein when the second touch event is performed in the trigger region, the screen does not respond and the trigger region is not activated.

\* \* \* \* \*